(12) United States Patent
Wu et al.

(10) Patent No.: US 7,313,007 B2
(45) Date of Patent: Dec. 25, 2007

(54) POWER FACTOR CORRECTION CONTROLLER

(75) Inventors: Tsai-Fu Wu, NO. 24-7, Hu Wei Liao Rd., lin 2, Jen Pei Tsun, Min Hsiang, Chia I Hsien (TW); Yaow-Ming Chen, Kao Hsiung (TW); Jiun-Ren Tsai, Tai Nan Hsien (TW)

(73) Assignee: Tsai-Fu Wu, Chia Hsien (TW)

( * ) Notice: Subject to any disclaimer, the term of this patent is extended or adjusted under 35 U.S.C. 154(b) by 96 days.

(21) Appl. No.: 11/407,225

(22) Filed: Apr. 20, 2006

(65) Prior Publication Data

US 2007/0247121 A1   Oct. 25, 2007

(51) Int. Cl.
*H02M 7/00* (2006.01)
*H02M 5/42* (2006.01)
*G05F 1/00* (2006.01)

(52) U.S. Cl. .................................. 363/65; 363/89
(58) Field of Classification Search ................ 363/20, 363/21.01, 21.12, 65, 71, 78, 84, 89, 125, 363/127; 323/222, 223
See application file for complete search history.

(56) References Cited

U.S. PATENT DOCUMENTS

| 5,610,804 | A | * | 3/1997 | Shimizu | 363/21.16 |
| 6,282,109 | B1 | * | 8/2001 | Fraidlin et al. | 363/89 |
| 6,834,002 | B2 | * | 12/2004 | Yang | 363/89 |
| 7,248,485 | B2 | * | 7/2007 | Hermann et al. | 363/20 |
| 2006/0158912 | A1 | * | 7/2006 | Wu et al. | 363/89 |

* cited by examiner

*Primary Examiner*—Matthew V. Nguyen
(74) *Attorney, Agent, or Firm*—Rosenberg, Klein & Lee

(57) ABSTRACT

A power factor correction controller simultaneously controls several power converters to be operated at a critical conduction mode to improve the overall conversion efficiency and conversion power of the power factor corrector. The controller includes a primary power converter control circuit for feeding back an input voltage signal, an output voltage signal and a primary current signal, and outputting a primary gate control signal for controlling a primary power switch; at least one secondary power converter control circuit for receiving the primary gate control signal and outputting a secondary gate control signal for controlling a secondary power switch; and a phase splitter circuit for receiving the primary gate control signal to control a gate output driving circuit, so that the gate output driving circuit outputs the secondary gate control signal.

22 Claims, 12 Drawing Sheets

POWER FACTOR CORRECTION CONTROLLER

BACKGROUND OF THE INVENTION

1. Field of the Invention

The present invention relates to a power factor correction controller, and more particularly to a power factor correction controller capable of simultaneously controlling several power converters to improve the overall conversion efficiency and conversion power of a power factor corrector.

2. Description of Related Art

Since the present household or industrial electric appliances have a voltage difference with the input power supply terminal (such as a public utility electricity terminal) or even have an input current with a high-peak factor (harmonics), and thus the quality of electricity drops, and it is necessary to have a power factor corrector for the power factor correction and harmonic suppression. The main function of the power factor corrector is to compensate the phase difference of the current with respect to the voltage of the electric appliances and suppress the harmonic current produced by the electric appliances, so as to avoid adverse effects on the quality of electric power. In general, an electric company prefers simply connecting a resistor load to a power circuit to producing currents with a high-peak value, since the currents with a high-peak value may fuse a circuit breaker easily and cause a disorder to a voltage regulating circuit.

The power factor corrector is generally divided into a power stage and a control stage. Referring to FIG. 1 for the circuit diagram of a prior art power factor corrector, the electric structure of a power factor corrector 32 includes a rectifying circuit 30 for converting an input of public utility electricity AC into a DC power, and a load 34 is another electric circuit of an electric appliance. As to the power stage 322 of the power factor corrector 32, there are several common topological structures: a boost structure, a buck structure and a flyback structure. In these structures, the boost structure uses a single stage circuit to achieve a high power factor and a lower harmonic effect, and thus it is the most popular one used for a power factor corrector 32. As to the control stage 324, it is divided into two main types: a continuous conduction mode or a critical conduction mode depending on the operating mode of its power converter (power stage 322). If the inductor current of the controlled power converter is in a continuous conduction (except when the input voltage is zero, the inductor current will be greater than zero for each cycle) or in a critical conduction (the inductance will drop to zero for each cycle), and both use a control circuit 3241 to process the signals including a feedback output voltage, an input current and an input voltage, and determine the gate control signal of a power switch component Q at a drive stage 322, so that a high frequency switch is used to force the input current to follow the reference current signal determined by the voltage waveform of the public utility electricity, so as to achieve the power factor correction.

At present, most of the control stages of the continuous conduction mode power factor corrector use the UC3854 IC (or other equivalent ICs) for the control. Referring to FIG. 2 for the circuit diagram of a prior art power factor correction controller that employs the UC3854 IC as a controller, a control circuit 26 of the UC3854 includes three parts: a current feedback control stage 266, a voltage feedback control stage 264 and a feedforward control stage 262. Most critical conduction mode power factor correctors use the L6561 IC (or other equivalent ICs) for the control. Referring to FIG. 3 for the circuit diagram of a prior art power factor correction controller that employs the L6561 IC as a controller, a control circuit 46 of the L6561 IC includes four parts: a current reference signal feedback control 462, a voltage feedback control 464, a current feedback control 466 and a drain-source zero voltage detecting circuit 468. The operating method for both modes are prior arts and thud will not be described further here, and only their advantages and disadvantages will be given below.

The UC3854 IC controls the power converters to be operated in the continuous conduction mode, and thus having the advantages of a high conversion power and a low input current ripple. Since the power switch of the power converters is operated at a compulsory switching mode, therefore the UC3854 IC has the disadvantage of a low conversion efficiency. Further, this control includes three major parts: a feedforward feedback control, a voltage feedback control and a current feedback control. For a high conversion power, it requires other auxiliary circuits to flexibly switch the power switch of the main circuit in order to improve the conversion efficiency, and thus additional control of at least one set of auxiliary circuits is needed, and the control will become very complicated. The L6561 IC controls the converter to be operated at a critical conduction mode, and thus the power switch must have a flexible switching characteristic, and the power converter has high conversion efficiency. However, the input current ripple of the power factor corrector operated at the critical conduction mode is larger, and thus requiring a specification for larger components and a pre-filter to achieve the power factor correction, since its conversion power is usually not high (or below 100 W).

To overcome the foregoing shortcomings, the present invention provides a power factor correction controller, not only controlling the power factor corrector to achieve a high power factor effect, but also providing a high conversion efficiency and a high conversion power without producing a high input current ripple at the input terminal.

SUMMARY OF THE INVENTION

In view of the foregoing shortcomings, the present invention provides a power factor correction controller that can simultaneously control several power converters to be operated at a critical conduction mode, so as to enhance the overall conversion efficiency and conversion power of the power factor corrector and overcome the shortcomings of the traditional power factor corrector operated in a critical conduction mode having a limitation on the conversion power and a drawback of a low conversion efficiency.

A power factor correction controller comprises: a primary power converter control circuit coupled to an input terminal and a load terminal of a system circuit for feeding back an input voltage signal, an output voltage signal and a primary current signal, and outputting a primary gate control signal to control a primary power switch of a primary power converter; at least one secondary power converter control circuit for receiving the primary gate control signal to output a secondary gate control signal and control a secondary power switch of a secondary power converter; and a phase splitter circuit installed at the secondary power converter control circuit for receiving the primary gate control signal to control a gate output driving circuit, so that the gate output driving circuit outputs the secondary gate control signal.

The primary power converter and secondary power converters are driven alternately, and the primary power converter and the secondary power converters are controlled at a critical conduction mode.

To make it easier for our examiner to understand the innovative features and technical content, we use a preferred embodiment together with the attached drawings for the detailed description of the invention, but it should be pointed out that the attached drawings are provided for reference and description but not for limiting the present invention.

DETAILED DESCRIPTION OF THE PREFERRED EMBODIMENTS

The present invention relates to a critical conduction mode power factor correction controller of an alternating frequency conversion control. The power factor correction controller is coupled to a power input terminal of a power stage circuit for controlling the high power factor and low harmonics of the power stage circuit and mainly obtaining a voltage signal and a current signal of the public utility electricity inputted from the power stage circuit (or obtaining the related signals between the voltage signal and current signal) together with the output voltage signal to determine a correct gate control signal of the power switch component, and then use the high frequency switching characteristic of the power switch to force the input current to follow the reference current signal, so as to control the input current and input voltage of the power stage circuit to have the same phase and maintain the function of a sine-wave waveform. The present invention adopts a plurality of alternating controlled power converters connected in parallel to improve the conversion power of the power factor corrector and reduce the input current ripple and the normal rated specification of components and control each set of power converters to be operated at the critical conduction mode, so as to reduce the conduction loss and improve the conversion efficiency.

Figure 1:
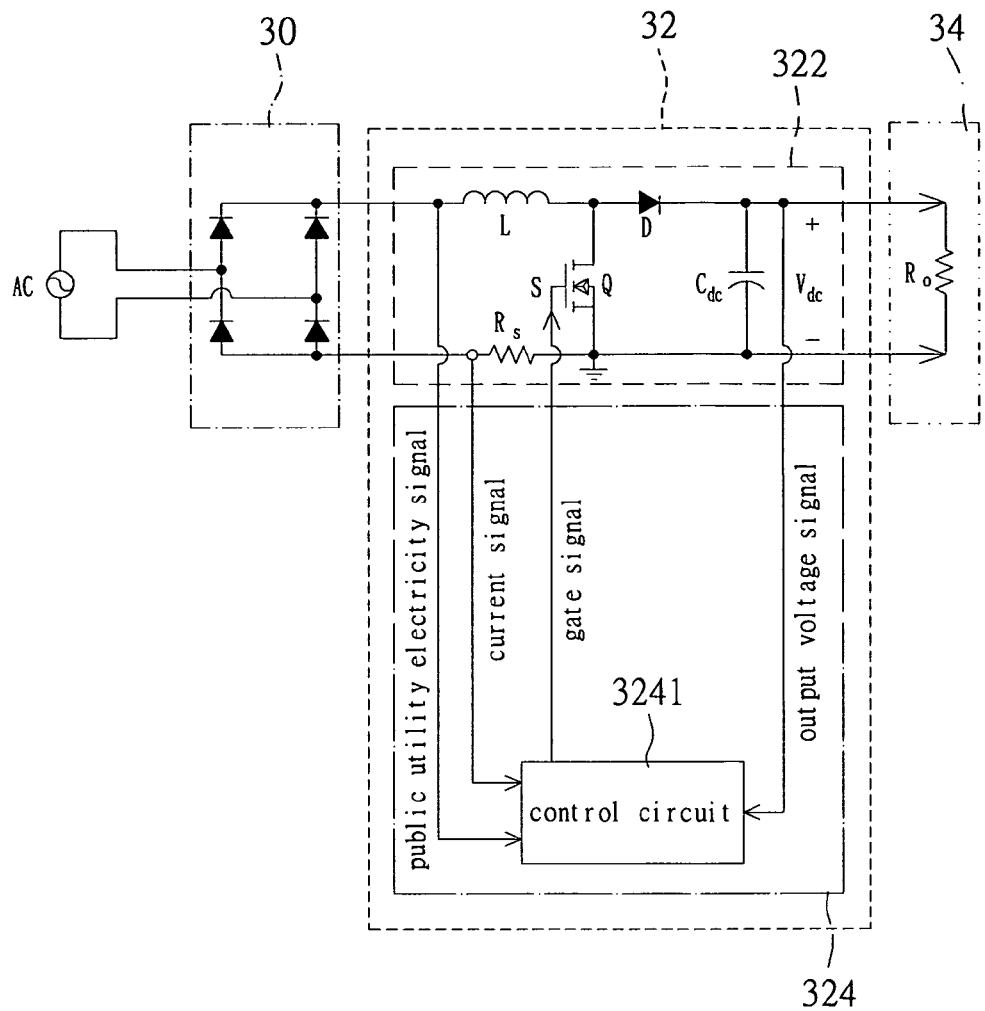
FIG. 1 is a circuit diagram of a prior art power factor corrector.
Figure 2:
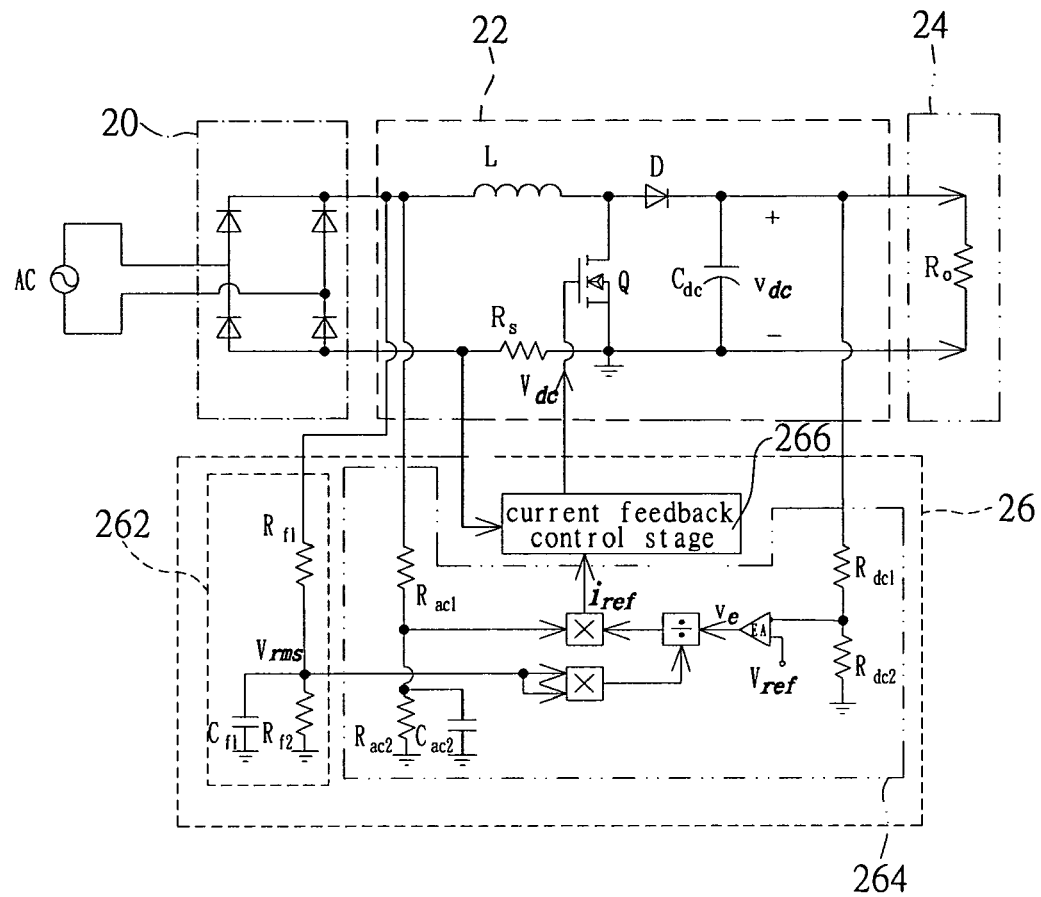
FIG. 2 is a circuit diagram of a prior art power factor correction controller that employs the UC3854 IC as a controller.
Figure 3:
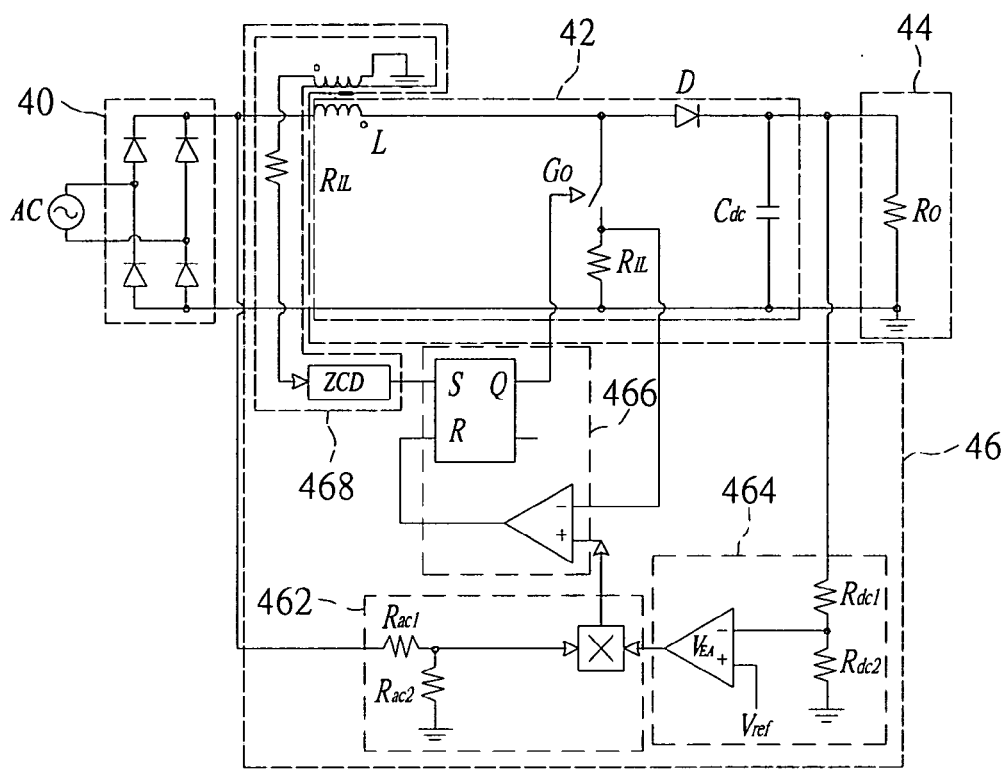
FIG. 3 is a circuit diagram of a prior art power factor correction controller that employs the L6561 IC as a controller.
Figure 4:
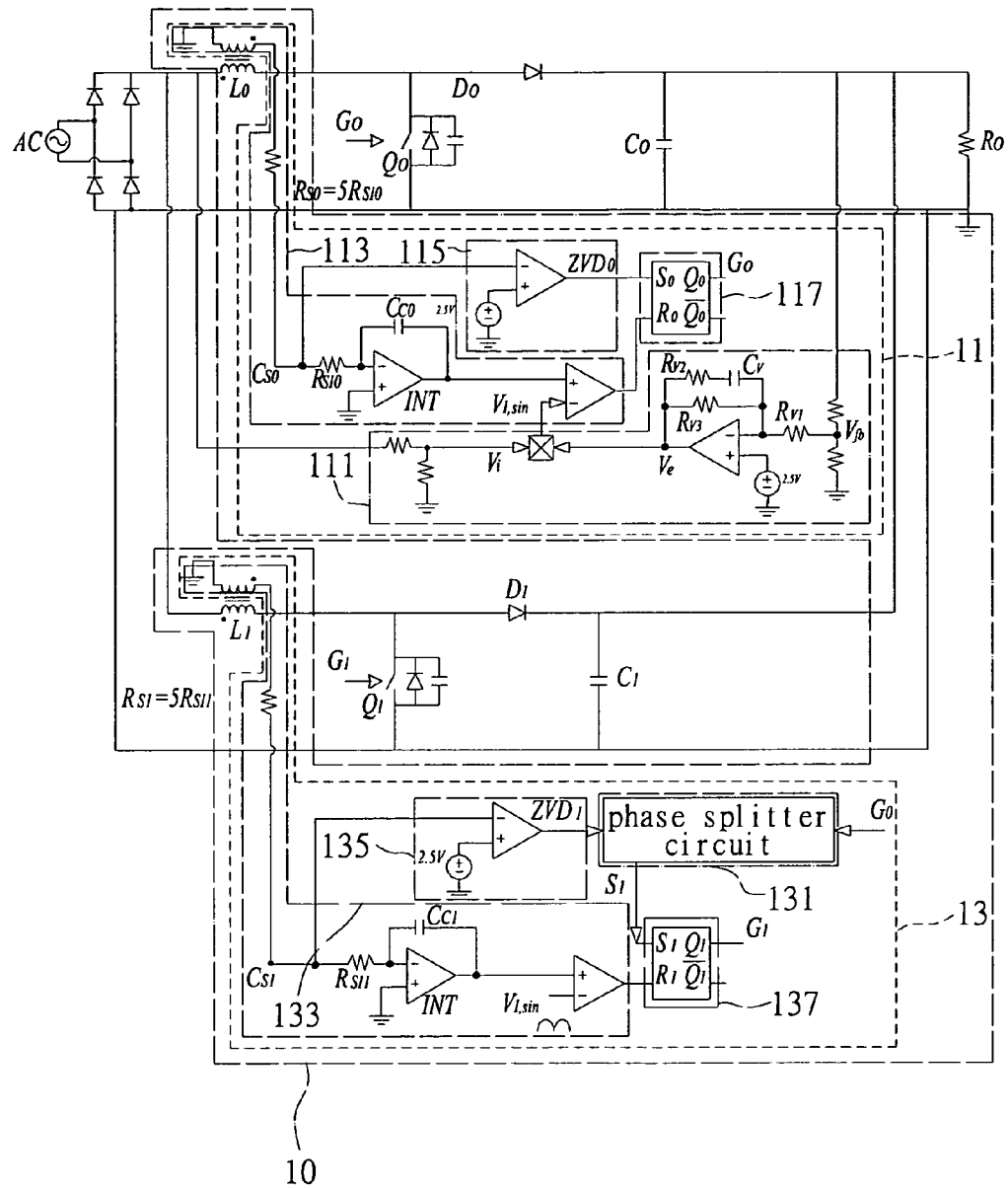
FIG. 4 is a circuit block diagram of a critical conduction mode power factor correction controller capable of alternately controlling frequencies according to the present invention.

Referring to FIG. 4 for the circuit block diagram of a critical conduction mode power factor correction controller capable of alternately controlling frequencies according to the present invention, a critical conduction mode power factor correction controller 10 comprises a primary power converter control circuit 11 and a secondary power converter control circuit 13. The primary power converter control circuit 11 includes a voltage feedback control circuit 111, a current feedback control circuit 113, a power switch drain-source zero voltage detection (ZVD) circuit 115 and a gate output driving circuit 117. The secondary power converter control circuit 13 includes a phase splitter circuit 131, a current feedback control circuit 133, a power switch drain-source zero voltage detection (ZVD) circuit 135 and a gate output driving circuit 137.

Figure 4B:
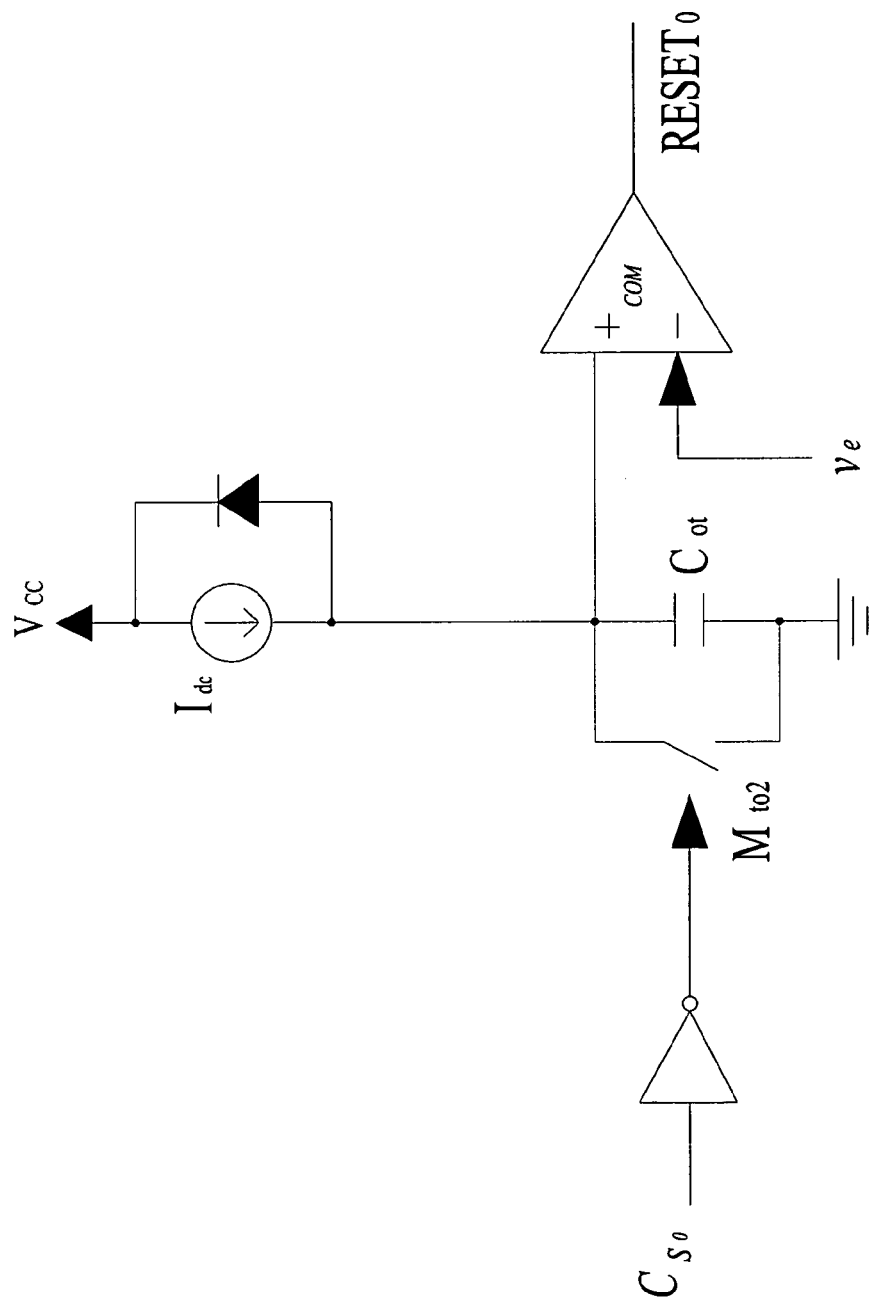
FIG. 4B a circuit diagram of controlling a constant conduction time.

In the primary power converter control circuit 11, the voltage feedback control circuit 111 comprises an error amplifier circuit for feeding back an output voltage signal and obtaining an output error signal; a pair of voltage division resistors for feeding back an input voltage signal as a current reference signal; and a multiplier circuit for multiplying the output error signal by the input voltage signal to obtain a reference current signal $V_{I,sin}$. The current feedback control circuit 113 includes an inductor secondary winding (which is equivalent to a secondary transformer) for converting an inductor current signal (close to a trigonometric wave) of a power stage inductor current into a voltage of an inductor current signal (close to a square wave); an integrator for integrating the voltage of the inductor current signal to obtain an integration signal; and a comparator for comparing the integration signal (close to a trigonometric wave—inductor current signal) and the reference current signal $V_{I,sin}$ to obtain a reset signal $R_0$ (Reset$_0$) of a power switch $Q_0$ of the primary power converter. The integrator and comparator can be substituted by a set of constant conduction time control circuit. Referring to FIG. 4B for the circuit diagram of controlling the constant conduction time, the constant conduction time control also can achieve the effect of a power factor correction (refer to Note 1). The power switch drain-source zero voltage detection circuit 115 is a comparator circuit for determining a positive edge of the inductor current signal of the voltage to output a drain-source zero voltage division signal $ZVD_0$ as a set signal $S_0$ (Set$_0$) of the power switch $Q_0$. The gate output driving circuit 117 includes a latch circuit for latching the $S_0$ and $R_0$ signals to obtain a gate control signal $G_0$ of the power switch $Q_0$; and an amplifying circuit sufficient to drive the power switch.

Note 1: Assumed that an input voltage $v_{in}$ of a power factor corrector is a sine-wave signal, $$v_{in} = V_m \cdot \sin \omega t, \quad (1)$$

Where, $V_m$ is the amplitude of $v_{in}$. In a critical conduction mode, the inductor current $i_L$ can be expressed as $$i_L = \frac{V_{in}}{L} \cdot T_{on} = i_{in}, \quad (2)$$

Where, $T_{on}$ is the conduction time, and $i_{in}$ is the input current. From (1) and (2), $$i_{in} = \frac{V_m \cdot \sin\omega t}{L} \cdot T_{on}. \quad (3)$$

From (3), $T_{on}$ will be a sine wave which is the same as the input voltage if the input current is constant, so as to achieve the effect of a power factor approximately equal to 1.

In the secondary power converter control circuit 13, the current feedback control circuit 133 is divided into two types according to the phase splitting method adopted by the phase splitter circuit. The first type of phase splitter circuit adopts a phase splitting of conduction signals, and the current feedback control circuit includes an inductor secondary winding (which is equivalent to a secondary transformer) for converting a power stage inductor current signal (close to a trigonometric wave) into an inductor current signal (close to a square wave) of a voltage; an integrator integrates the inductor current signal of the voltage to obtain an integration signal; and a comparator for comparing the integration signal (close to a trigonometric wave—inductor current signal) and the reference current signal $V_{I,sin}$ (produced by the voltage feedback control circuit 111 in the primary power converter control circuit 11 to obtain a reset signal $R_1$ ($Reset_1$) of a power switch $Q_1$ of the secondary power converter. The second type uses a reset signal for the phase splitting and only requires a phase splitter circuit to obtain a $R_1$ signal, and thus the circuits including the integrator and comparator in the secondary power converter control circuit of the first type can be omitted. The power switch drain-source zero voltage detection circuit 135 is a comparator circuit for determining a positive edge of the voltage of an inductor current to output a drain-source zero voltage division signal $ZVD_1$ from the secondary power converter power switch. The phase splitter circuit 131 feeds back a gate control signal $G_0$ of the primary power converter power switch and a drain-source zero voltage division signal $ZVD_1$. After the computation, a set signal $S_1$ ($Set_1$) or a reset signal $R_1$ ($Reset_1$) of the power switch $Q_1$ is obtained. The gate output driving circuit 137 includes a latch circuit for latching the $S_1$ and $R_1$ signals to obtain a gate control signal $G_1$ of the power switch $Q_1$; and an amplifying circuit sufficient to drive the power switch.

The primary power converter and the secondary power converter in the power factor corrector are connected in parallel to enhance the system reliability. Further, the primary power converter and the secondary power converters can be integrated into an integrated circuit, which is a modular circuit for simplifying the level of complexity of the circuit design.

Figure 5:
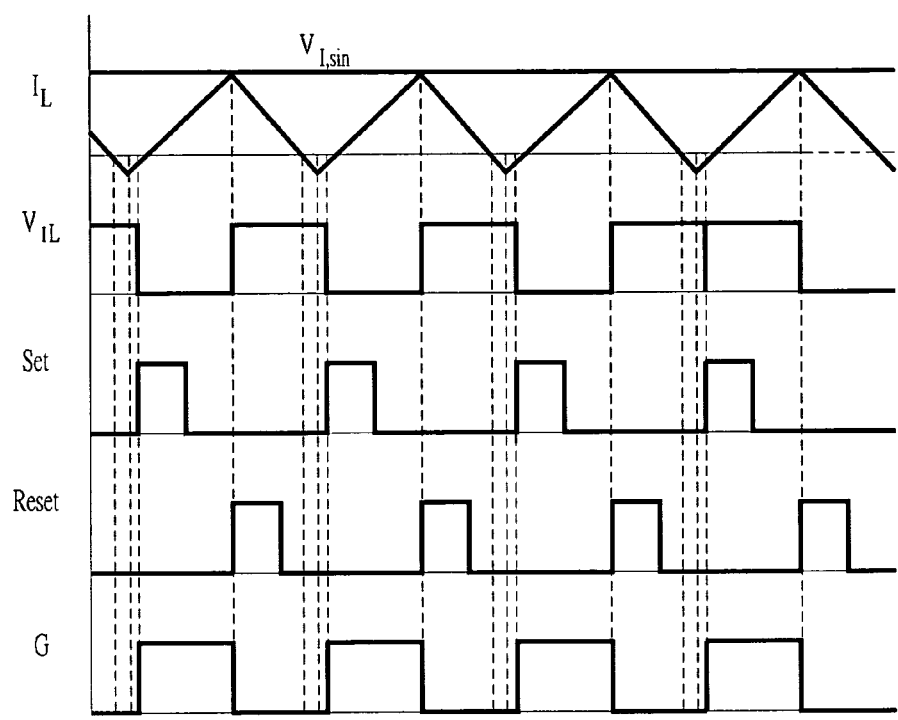
FIG. 5 is a timing diagram of a drain-source zero voltage point detection of a power switch according to the present invention.

Referring to FIG. 5 for the timing diagram of a drain-source zero voltage point detection of a power switch according to the present invention, $V_{I,sin}$ is a reference current, $I_L$ is an inductor current, $V_{IL}$ is an inductor current of the voltage, Set is a power switch set signal, Reset is a power switch reset signal, and G is a power switch gate control signal in the power switch. In FIG. 5, the inductor current $I_L$ rises to the same level as the reference current $V_{I,sin}$, and thus the power switch reset signal Reset will be triggered, and the power switch will be reset, and the inductor current $I_L$ will start dropping, and the inductor current $V_{IL}$ of the voltage will change from $+V_{cc}$ to 0. If the inductor current $I_L$ drops to 0, the inductance will start producing a resonance with a parasitic capacitor on the power switch, so that the inductor current continues dropping to a negative current. If the inductor current $I_L$ drops to a minimum, the inductor current $I_L$ will be increased slowing. Since the change of the current slope will change the inductor current $V_{IL}$ of the voltage from 0 to +Vcc to trigger the power switch set signal Set and drive the power switch to be conducted. By then, the drain-source voltage of the power switch approaches 0 and the power switch has a zero voltage switching characteristic.

Figure 6:
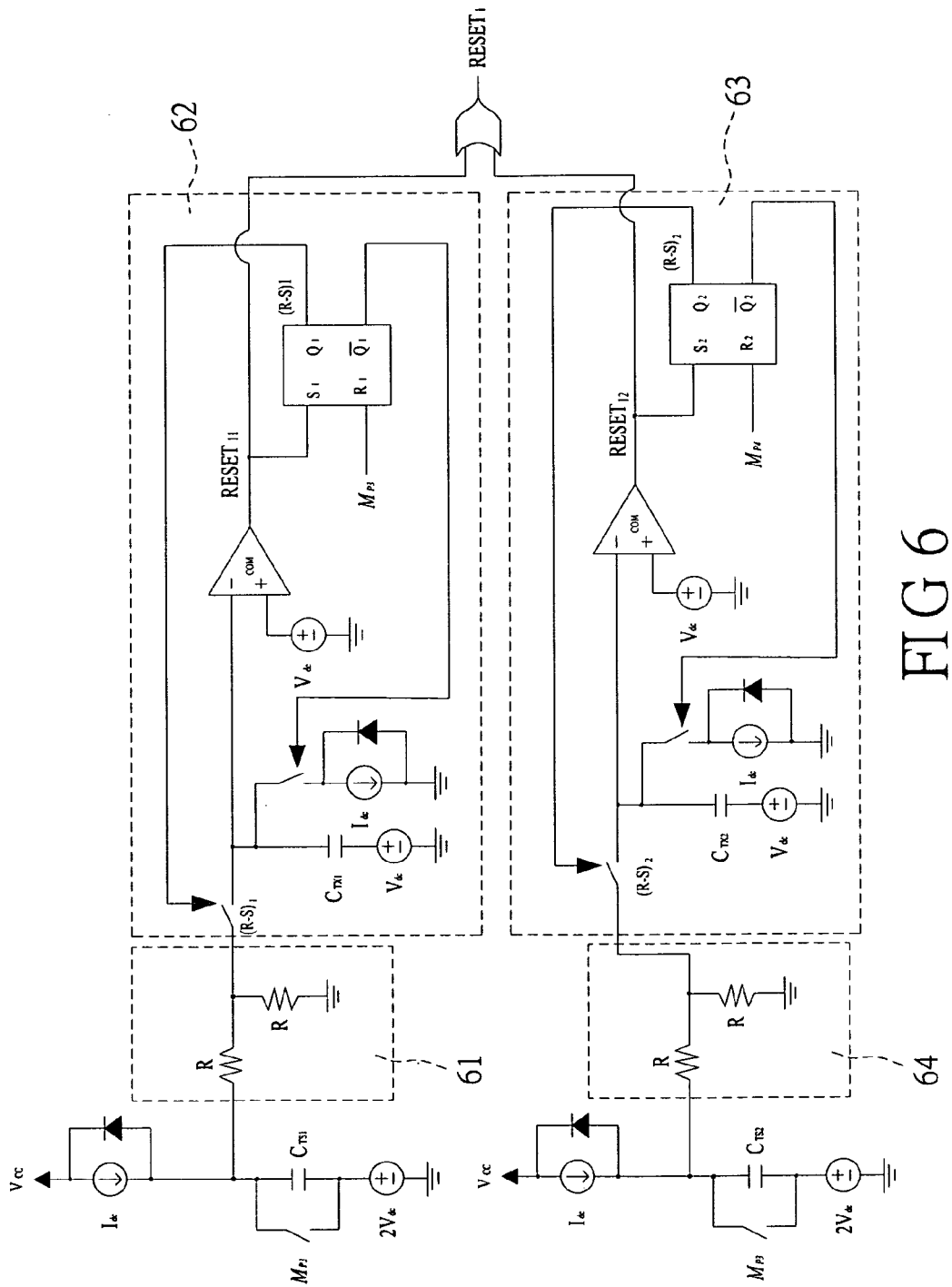
FIG. 6 is a circuit diagram of a phase splitter circuit according to a first preferred embodiment of the present invention.
Figure 7:
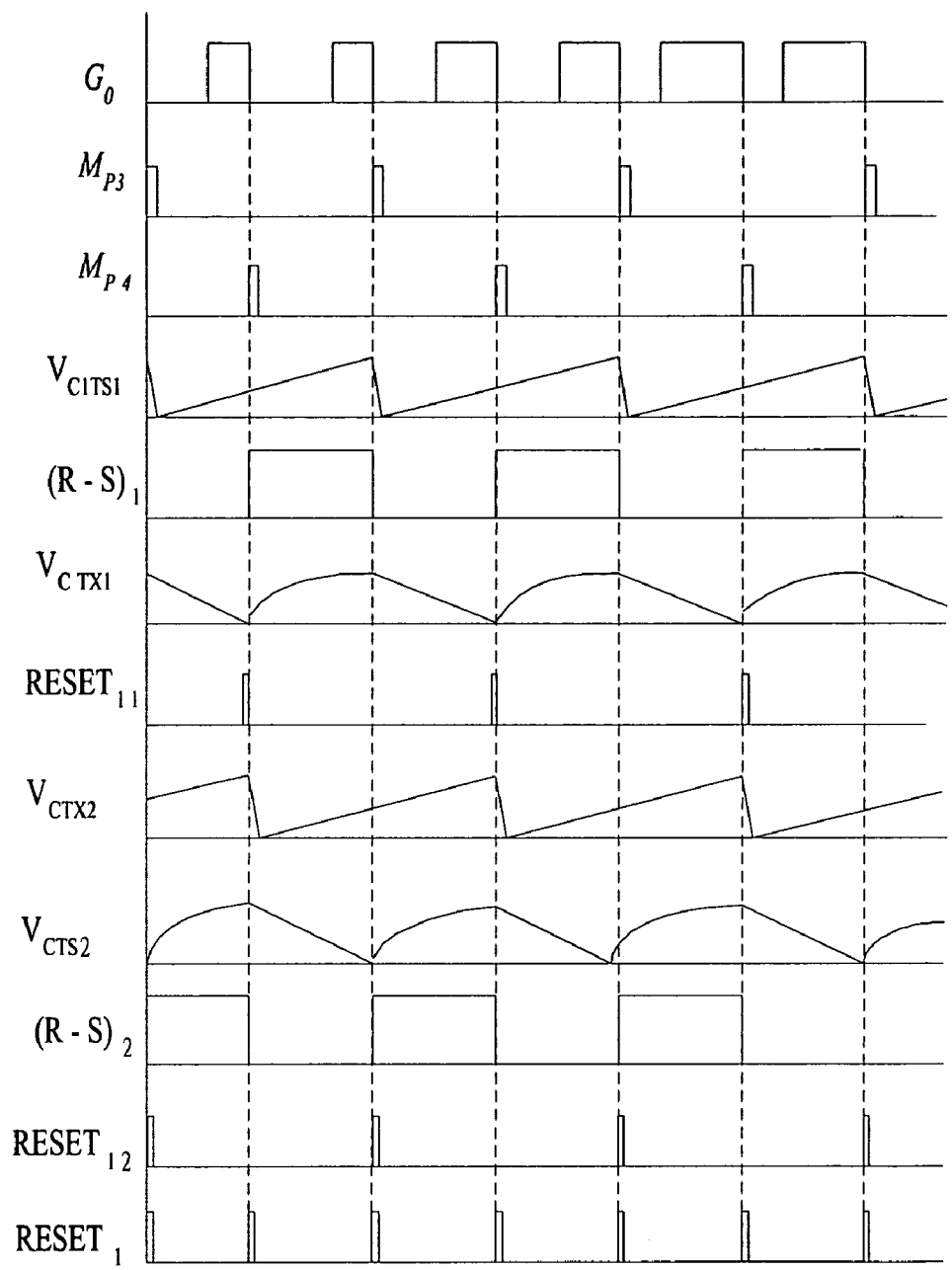
FIG. 7 is a waveform diagram of each component of a phase splitter circuit according to a first preferred embodiment of the present invention.

Referring to FIGS. 6 and 7 for the circuit diagram and the waveform diagram of a phase splitter circuit according to a preferred embodiment of the present invention respectively, if each negative edge trigger signal of the gate control signal $G_0$ of the primary power converter power switch in the phase splitter circuit is produced, several control signals: $(R-S)_1$, $(R-S)_2$, $M_{P3}$ and $M_{P4}$ will be produced; $M_{P3}$ and $M_{P4}$ will discharge the capacitor $C_{Ts1}$, $C_{Ts2}$ at each negative edge of $G_0$, and the capacitor $C_{Ts1}$, $C_{Ts2}$ will be charged by a constant current source $I_{dc}$ in a cycle $G_0$ to obtain a signal $V_{CTS1}$, $V_{CTS2}$ that represents the length of a cycle. A voltage division circuit 61 is used to divide the voltage into $0.5V_{CTs1}$ ($V_{CTS2}$ uses the voltage division circuit 64 to divide the voltage into $0.5V_{CTs2}$) which is recorded into the capacitor $C_{Tx1}$ of the first phase detection circuit 62 (or $0.5V_{CTs2}$ is recorded to the capacitor $C_{Tx2}$ of the second phase detection circuit 63). The first cycle is recorded to the capacitor $C_{Tx1}$, and now the capacitor $C_{Tx2}$ is discharged; and the next cycle is recorded to the capacitor $C_{Tx2}$, and then the capacitor $C_{Tx1}$ carries out the discharge. The current source $I_{dc}$ having the same capacity of $C_{TS}$ charges the capacitor $C_{Tx1}$, $C_{Tx2}$. Till the voltage of the capacitor $C_{Tx1}$, $C_{Tx2}$ drops to $V_{dc}$, the phase splitting point signal $RESET_{11}$ and $RESET_{22}$ of the power components of the secondary power converter will be triggered, and an XOR is performed for these two signals to obtain the required reset signal $Reset_1$ ($R_1$) which is outputted to the gate output driving circuit. The gate control signal $G_0$ of the primary power converter power switch is not limited for the use in the negative edge trigger signal, but it can be used for the positive source trigger signal similarly.

Figure 8:
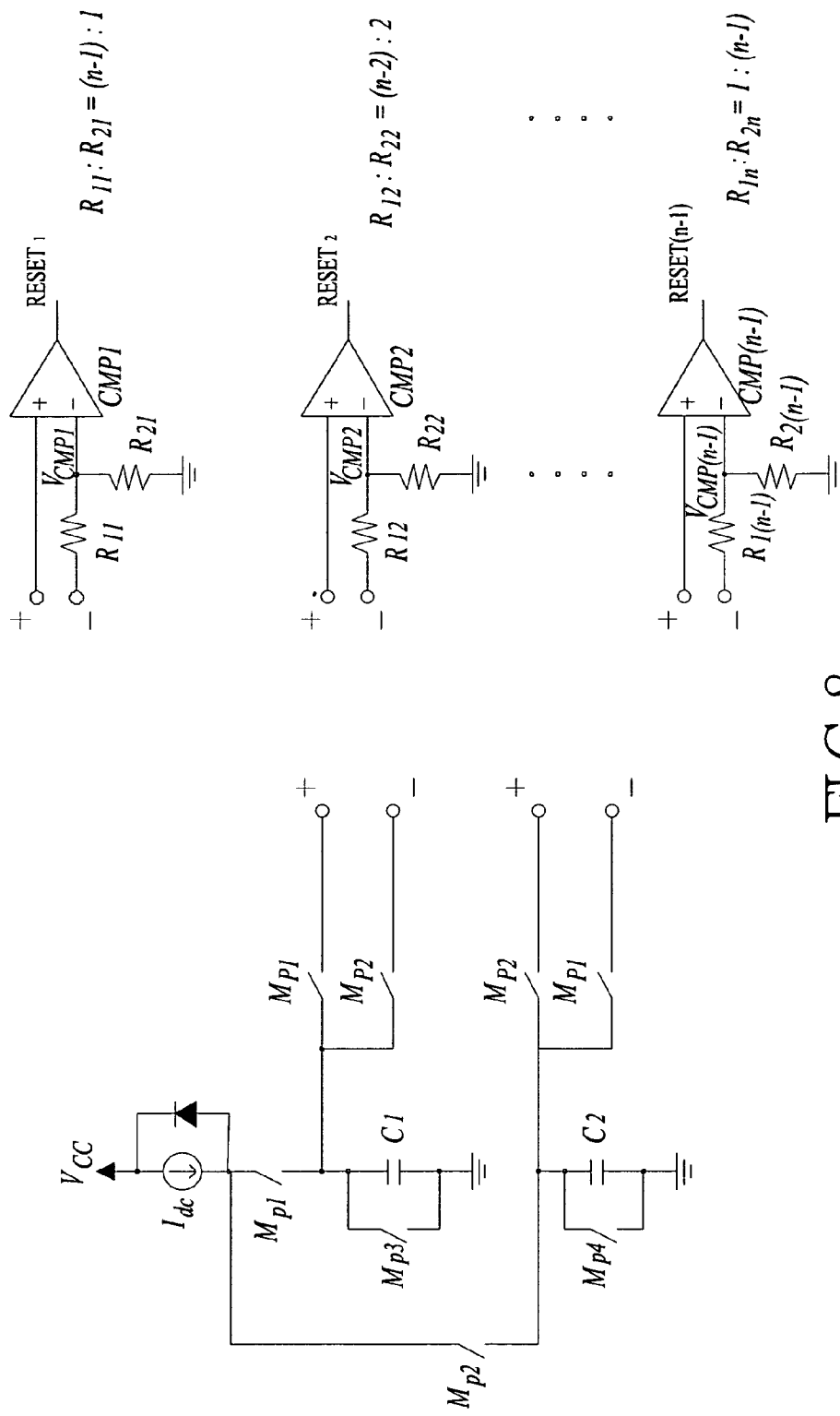
FIG. 8 is a circuit diagram of a phase splitter circuit according to a second preferred embodiment of the present invention.
Figure 9:
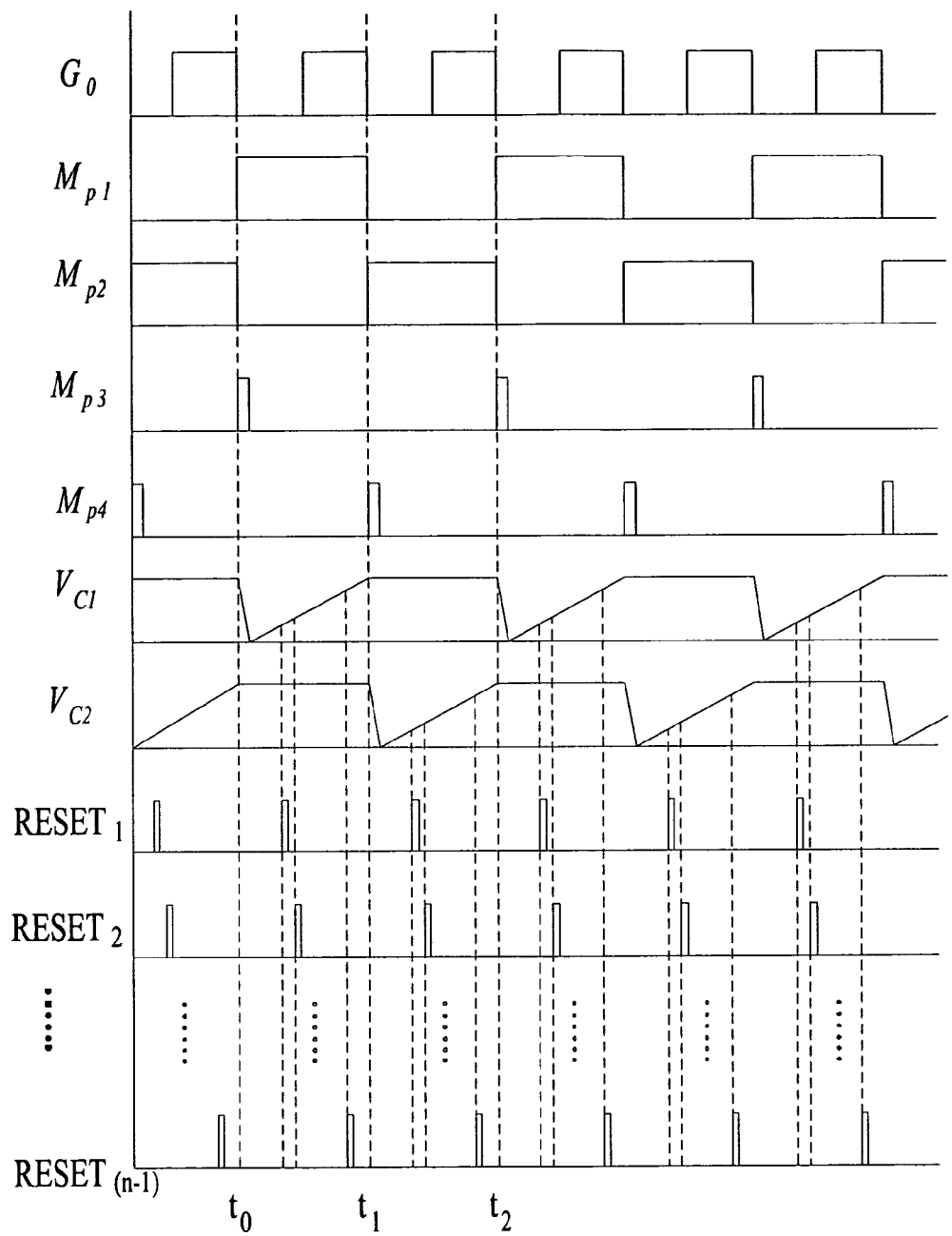
FIG. 9 is a waveform diagram of each component of a phase splitter circuit according to a second preferred embodiment of the present invention.

Referring to FIGS. 8 and 9 for the circuit diagram and the waveform diagram of a phase splitter circuit according to a second preferred embodiment of the present invention respectively, the second preferred embodiment of the invention includes a primary power converter and a plurality of secondary power converters and has a phase splitting number n. In the phase splitter circuit, a negative edge (or a positive edge) of the gate control signal $G_0$ of the primary power converter power switch is used to obtain each control signal $M_{P1}$~$M_{P4}$, and then the capacitor $C_1$, $C_2$ are charged alternately to maintain the constant voltage signal, so that each cycle has a capacitor voltage which remains unchanged and serves as a reference. Another capacitor is charged, and its voltage is used for the comparison. For example, the first cycle $C_1$ maintains its voltage value, and $C_2$ is discharged to 0 according to $M_{P4}$ and then $C_2$ continues charging in a cycle according to $M_{P2}$. Since the charging current of the two capacitors is equal, therefore the input voltage at the negative terminal of a post-stage comparator is designed as 1/n times of the reference voltage to produce a trigger signal at the phase shift of 360°/n. Taking the phase splitting number 3 for example, a first reset signal $RESET_1$ in the first cycle will be triggered (at 120°) when the $V_{C2}$ is charged to ⅓$V_{C1}$;

a second reset signal $RESET_2$ will be triggered (at 240°) when the $V_{C2}$ is charged to $\frac{2}{3}V_{C1}$; in the next cycle, $C_2$ remains its voltage and $C_1$ is charged for the same comparison. In addition, the same concept is applied to the phase splitting signal at a positive edge of the gate control signal $G_0$ of the primary power converter power switch to output the reset signals ($RESET_1$, $RESET_2$ ... $RESET_{(n-1)}$) to the gate output driving circuit for the control of a power switch of the secondary power converter.

Figure 10:
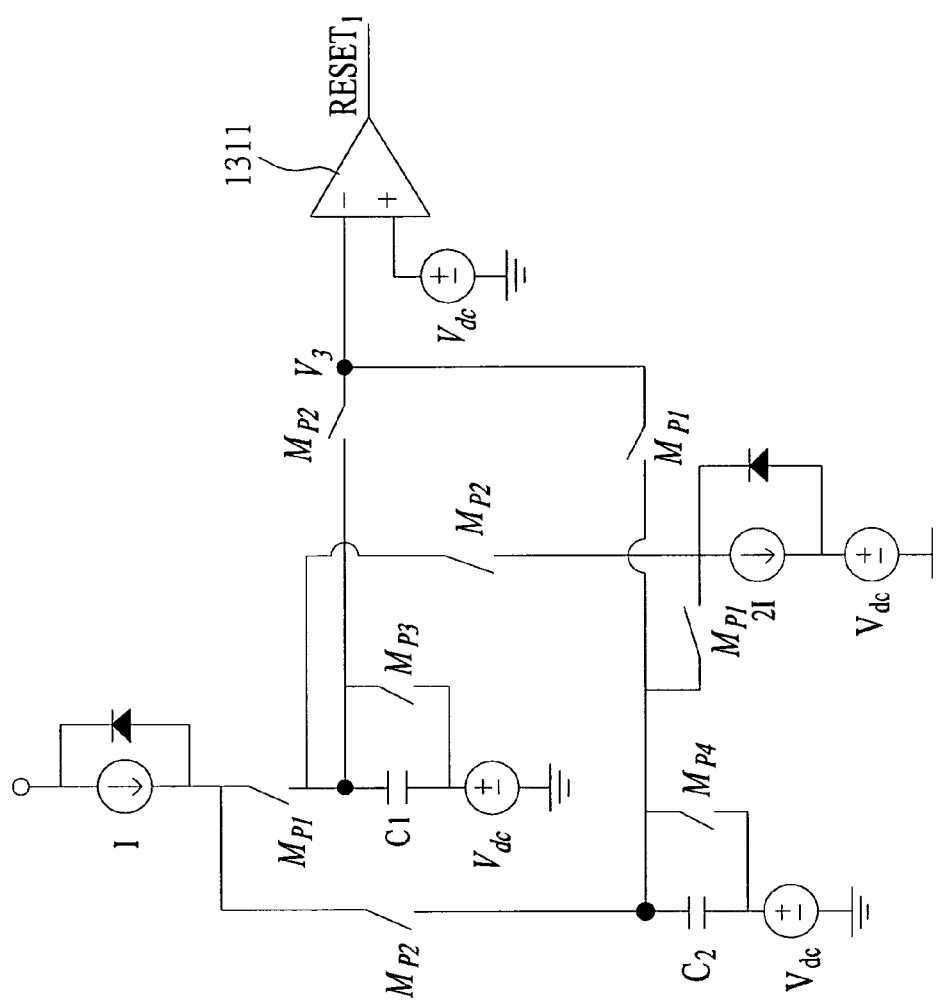
FIG. 10 is a circuit diagram of a phase splitter circuit according to a third preferred embodiment of the present invention.
Figure 11:
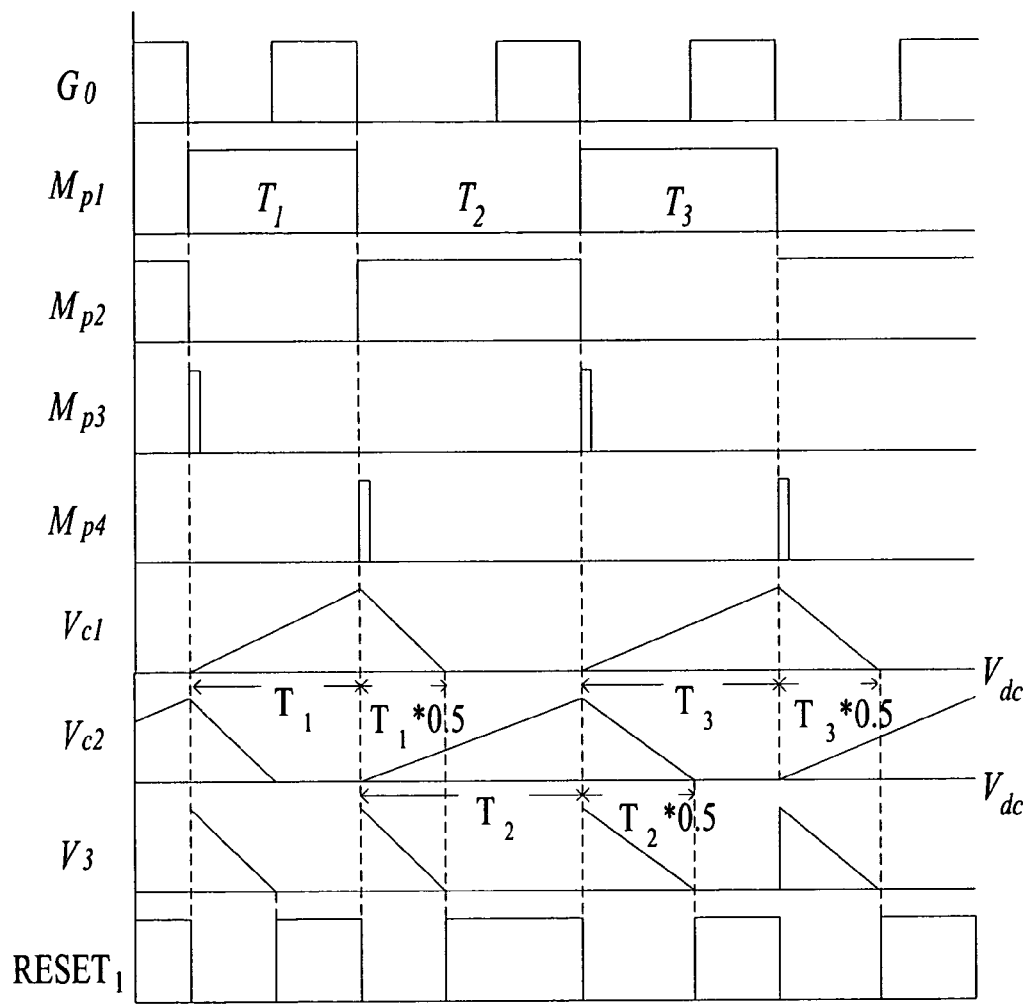
FIG. 11 is a waveform diagram of each component of a phase splitter circuit according to a third preferred embodiment of the present invention.

Referring to FIGS. 10 and 11 for the circuit diagram and the waveform diagram of a phase splitter circuit according to a third preferred embodiment of the present invention respectively, the phase splitter circuit uses different charging and discharging currents to produce the phase splitting signals. In FIGS. 10 and 11, the gate control signal $G_0$ of the primary power converter power switch is used to produce control signals $M_{P1} \sim M_{P4}$ and alternately charging the capacitors $C_1$, $C_2$ with one time of the current I and discharging the capacitors $C_1$, $C_2$ with double of the current 2I, and a comparator 1311 is used to find the required phase splitting point. If the phase splitting number is equal to 3, three times are used for the discharge, and an additional set of a comparator, a capacitor and a capacitor charging/discharging current source is needed for discharging $\frac{2}{3}$ of the current; and thus resulting a larger phase splitting number. Further, the same concept can be applied for the phase splitting signal at a positive edge of the gate control signal $G_0$ of the primary power converter power switch.

It is worth to point out that the waveforms shown in the figure are used for illustrating the operation of each major circuit, and actual waveforms may vary).

In summation of the description above, the power factor correction controller of the invention can achieve the following effects:

1. Each set of power converters has the zero voltage switching characteristic.

2. The number of power converters in the power factor corrector can be increased according to different power requirements, and all of these power converters have an alternate control.

3. Since the power converters in the power factor corrector adopt an alternate control, therefore the power converters are components with a lower specification than a general critical conduction mode power factor corrector.

4. The phase splitter circuit required by a different number of power converters of the power factor corrector can be designed or expanded according to the same design similarly.

5. The primary power converter and secondary power converter can be modularized and thus simplifying the level of complexity of the circuit design.

6. Since the power converters in the power factor corrector are connected in parallel, therefore the system reliability can be improved.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power factor correction controller, comprising:
    a primary power converter control circuit, coupled to an input terminal and a load terminal of a system circuit for feeding back an input voltage signal, an output voltage signal and a primary current signal and outputting a primary gate control signal to control a primary power switch of a primary power converter;
    at least one secondary power converter control circuit, for receiving said primary gate control signal and outputting a secondary gate control signal to control a secondary power switch of a secondary power converter; and
    a phase splitter circuit, installed at said secondary power converter control circuit, for receiving said primary gate control signal to control a gate output driving circuit, so that said gate output driving circuit outputs said secondary gate control signal;
    whereby alternately drive said primary power converter and said secondary power converter.

2. The power factor correction controller of claim 1, wherein said primary power converter control circuit further comprises a voltage feedback control circuit for receiving said input voltage signal and said output voltage signal to output a reference current signal.

3. The power factor correction controller of claim 2, wherein said primary power converter control circuit further comprises a primary current feedback control circuit, for receiving a primary current signal and said reference current signal and outputting a primary gate reset control signal.

4. The power factor correction controller of claim 3, wherein said primary current feedback control circuit further comprises an inductor secondary winding for converting an inductor current signal of said system circuit into said primary current signal.

5. The power factor correction controller of claim 4, wherein said primary power converter control circuit further comprises a zero-crossing detection circuit for receiving said primary current signal and outputting a drain-source zero voltage division signal of said primary power switch.

6. The power factor correction controller of claim 5, wherein said drain-source zero voltage division signal is a primary gate set control signal.

7. The power factor correction controller of claim 5, wherein said zero-crossing detection circuit further comprises an edge comparison circuit for determining a positive edge or a negative edge of said primary current signal to obtain said drain-source zero voltage division signal.

8. The power factor correction controller of claim 5, wherein said primary power converter control circuit further comprises a gate output driving circuit for receiving said primary gate reset control signal and said drain-source zero voltage division signal to output said primary gate control signal.

9. The power factor correction controller of claim 8, wherein said primary gate reset control signal produced from an integrator receives said primary current signal, and then the output signal of said integrator compare with said reference current signal by a comparator.

10. The power factor correction controller of claim 9, wherein said integrator and said comparator are substituted by a constant conduction time control circuit.

11. The power factor correction controller of claim 2, wherein said secondary power converter control circuit further comprises a secondary current feedback control circuit for receiving a secondary current signal and said reference current signal to output a secondary gate reset control signal.

12. The power factor correction controller of claim 11, wherein said secondary current feedback control circuit further comprises an inductor secondary winding for converting an inductor current signal of said system circuit into said secondary current signal.

13. The power factor correction controller of claim 12, wherein said secondary power converter control circuit further comprises a zero-crossing detection circuit for receiving said secondary current signal and outputting a drain-source zero voltage division signal of said secondary power switch.

14. The power factor correction controller of claim 13, wherein said zero-crossing detection circuit further comprises an edge comparison circuit for determining a positive edge or a negative edge of said secondary current signal to obtain said drain-source zero voltage division signal.

15. The power factor correction controller of claim 13, wherein said phase splitter circuit receives said drain-source zero voltage division signal and said primary gate control signal to output a secondary gate set control signal.

16. The power factor correction controller of claim 15, wherein said gate output driving circuit receives said secondary gate set control signal and said secondary gate reset signal to output said secondary gate control signal.

17. The power factor correction controller of claim 1, wherein said primary power converter and said secondary power converters are connected in parallel with said system circuit.

18. The power factor correction controller of claim 1, wherein said primary power converter and said secondary power converters are critical conduction mode power converters.

19. The power factor correction controller of claim 1, wherein said primary power converter and said secondary power converters are integrated into an integrated circuit.

20. A phase splitter circuit of claim 1, comprising:
a first capacitor;
a first constant current source, for charging said first capacitor according to said primary gate control signal;
a first voltage division circuit, for dividing the charged voltage of said first capacitor;
a first phase detection circuit, comprising:
  a second capacitor, for recording a voltage-division voltage charged by said first capacitor;
  a second constant current source, for discharging said second capacitor according to said primary gate control signal;
  a comparator, for outputting a first phase splitting point signal according to the voltage of said second capacitor; and
  a flip-flop, for controlling said second capacitor to charge or discharge according to said first phase splitting point signal and said primary gate control signal;
a fourth capacitor;
a fourth constant current source, for charging said fourth capacitor according to said primary gate control signal;
a second voltage division circuit, for dividing the charged voltage of said fourth capacitor;
a second phase detection circuit, comprising:
  a third capacitor, for recording the voltage-division voltage charged by said fourth capacitor;
  a third constant current source, for discharging said third capacitor according to said primary gate control signal;
  a comparator, for outputting a second phase splitting point signal according to the voltage of said third capacitor; and
  a flip-flop, for controlling said third capacitor to charge or discharge according to said second phase splitting point signal and said primary gate control signal; and
an OR gate, for receiving said first and second phase splitting point signals to output a reset signal to control said gate output driving circuit.

21. A phase splitter circuit of claim 1, which is applied for said primary power converter to collocate with a plurality of secondary power converters, comprising:
a first capacitor, being discharged according to said primary gate control signal;
a second capacitor, being discharged according to said primary gate control signal;
a constant current source, for charging said first capacitor and said second capacitor according to said primary gate control signal; and
at least one comparator, for receiving an input voltage from a positive input terminal according to said primary gate control signal, and receiving a ratio voltage of said first capacitor or said second capacitor from a negative input terminal and outputting a reset control signal to control said gate output driving circuit after a comparison.

22. A phase splitter circuit of claim 1, comprising:
a first capacitor;
a second capacitor;
a first constant current source, for charging said first capacitor and said second capacitor according to said primary gate control signal;
a second constant current source, being double of said first constant current source for discharging said first capacitor and said second capacitor according to said primary gate control signal; and
a comparator, for receiving voltages of said first capacitor and said second capacitor according to said primary gate control signal and comparing said voltages with a reference voltage, and then outputting a reset control signal to control said gate output driving circuit.

* * * * *